United States Patent [19]

Parks

[11] 4,157,629
[45] Jun. 12, 1979

[54] INSECT TRAP
[75] Inventor: James R. Parks, Ohio County, Ky.
[73] Assignee: Ralph H. Romans, Owensboro, Ky.
[21] Appl. No.: 895,040
[22] Filed: Apr. 10, 1978
[51] Int. Cl.² ............................................. A01M 1/04
[52] U.S. Cl. .................................................... 43/113
[58] Field of Search ...................... 43/113, 107, 132 R
[56] References Cited

U.S. PATENT DOCUMENTS

| | | | |
|---|---|---|---|
| 1,074,837 | 10/1913 | Cook | 43/113 |
| 2,577,436 | 12/1951 | Smith | 43/113 |
| 2,731,762 | 1/1956 | Jones | 43/113 |
| 3,348,332 | 10/1967 | O'Connell | 43/113 |
| 3,465,468 | 9/1969 | Takamoto | 43/113 |
| 4,086,720 | 5/1978 | Wiser | 43/113 |
| 4,086,721 | 5/1978 | Deas | 43/113 |

OTHER PUBLICATIONS

Tyler, Hamilton, Organic Gardening without Poisons, 1970, pp. 72 and 75.

Primary Examiner—Nicholas P. Godici
Attorney, Agent, or Firm—Nathan J. Cornfeld

[57] ABSTRACT

An insect trap is disclosed having a source of ultraviolet (UV) light to attract flying insects, the source being supported above a pan of water on the surface of which a petroleum liquid such as oil or kerosene is floated and into which the insects fly and are exterminated, the trap also comprising overflow means for ensuring that excess water tending to fill the pan actually overflows while at the same time the said means inhibits the spilling of oil or kerosene over the surrounding property.

6 Claims, 3 Drawing Figures

INSECT TRAP

BACKGROUND OF THE INVENTION

Hamilton Tyler, in his book entitled "Organic Gardening Without Poisons", published by Van Nostrand Reinhold Company, New York, 1970, on pages 72 and 75, describes an arrangement wherein a source of visible light is "mounted above a . . . pan of waste oil" and another, a so-called "home version is a lantern hung over a shallow pan containing water and a float of kerosene".

Other arrangements are described, some employing UV which is known to be particularly attractive to certain flying insects, it being apparent that some of the described arrangements are useful indoors, as for example in green houses, fast food outlets, bakeries, shopping malls and the like, while others are described to be advantageously used out-of-doors as at lawn parties, cook-outs or in backyards generally.

It is with the out-of-door variety of insect trap that this invention is particularly concerned, and especially with such traps that utilize an attractive UV source supported above a pan of water on which oil or kerosene or other petroleum liquid is floated. More particularly, this invention is directed to such arrangements as just described which are desirably disposed in unsheltered areas out-of-doors so as to be exposed to sudden rain showers. Under such circumstances the water with the oil or kerosene floated thereon, unless special provision is made to prevent it, can overflow spilling the oil or kerosene and the exterminated insects over the patio floor or other carefully maintained part of the backyard, thus to deface the surrounding property.

SUMMARY OF THE INVENTION

An insect trap especially useful for use in out-of-doors environments subject to rainfall is provided with a source of UV light to attract night flying insects such as flies, gnats, mosquitoes, and the like, the source being supported vertically above a pan of water on the surface of which oil or kerosene is floated into which the insects plunge and are exterminated, and overflow means responsive to a rise in water level above a predetermined amount to cause spill-over of the water without permitting the oil or kerosene to spill over. In one embodiment, the overflow means is constructed in cooperation with the support rods for the source of UV light. In another embodiment, the overflow means is formed independently of the support means.

It is therefore a principal object of this invention generally to improve the art of insect traps of the type employing a contained body of water having a film of petroleum liquid floated thereon.

Another object of this invention is to improve insect traps of the type just described by providing overflow means responsive to a rise in level of the water above a predetermined amount to discharge the water without discharging the petroleum liquid floated thereon, thereby to avoid damage to the surrounding property.

BRIEF DESCRIPTION OF THE DRAWING

Referring to the drawing, illustrating several forms my invention may assume.

Figure 1:
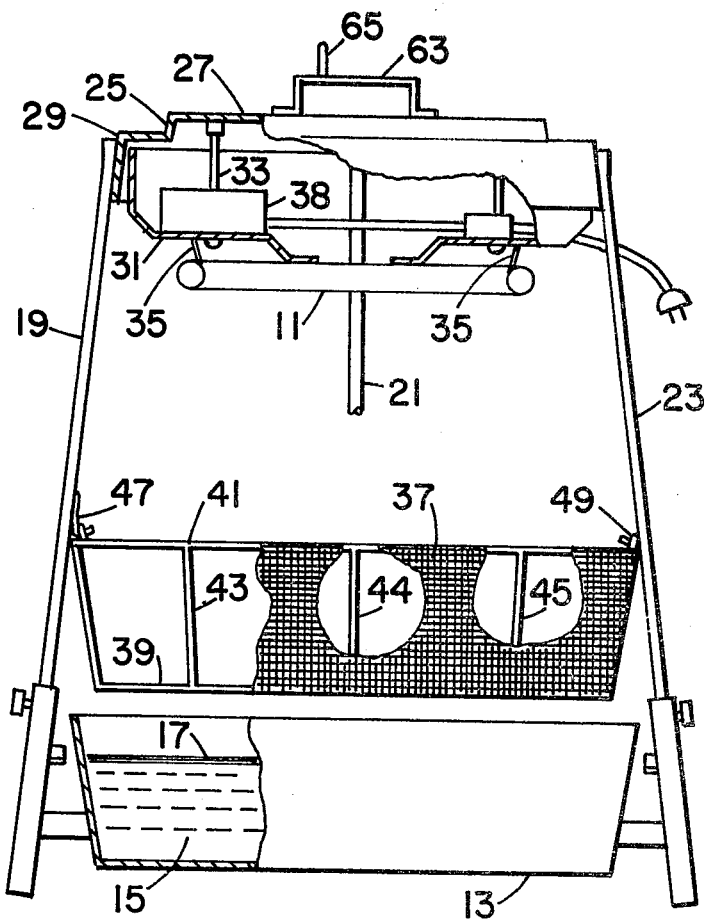
FIG. 1 is an elevational view with parts broken away of an insect trap with an exterminated-insect basket in non-operative position and illustrating the water overflow means.

Referring first to FIG. 1, there is shown an insect trap according to my invention, which comprises a source 11 of ultraviolet (UV) light, which in the illustrated embodiment is a ring-shaped tube gaseous discharge device capable, on energization, of emitting UV radiation, invisible to human eyes but attractive to many forms of flying insects. The source 11 is supported vertically above a pan or other tray-like container 13 of water 15 on the surface of which is floated a thin film of petroleum liquid 17 such as any light oil or kerosene.

The support for the UV light source 11 can be a frame comprising strut rods 19,21 and 23 supported at the respective upper ends of which is a housing 25 have a cover 27 which may be suitably affixed to the free ends of the struts in any conventional manner as by welding the free ends of struts 19,21 and 23 to a down turned flange 29 of cover 25.

The housing 25 is provided with a dish-shaped base 31 which, like the cover 27, may be of suitably formed sheet metal and which is secured to the cover 27 as by screws 33. Spring clips 35 are secured to the bottom of the base at conveniently spaced intervals, say 120° apart and are adapted to hold the tubular source 11 in position immediately adjacent the bottom of the base. If desire, the bottom of the base 31 can be painted with a suitable radiation absorptive paint (not shown) to minimize scatter of radiation in a direction away from the pan and the floating layer of petroleum liquid. The usual ballast 38 and other electrical components required for energization of the source 11 are, as is common, contained within the housing. The UV source 11 and associated housing 25 together with the electrical components for energizing the source are conventional and, per se, form no part of the invention.

As is also well known, UV radiation, is attractive to many forms of flying insets, such as flies, gnats, mosquitos and other pesty and harmful bugs. Such flying insects, when attracted to the source fly around it and eventually plunge downwardly toward and into the pan 13 where they strike the oil or kerosene and are promptly killed, sinking through the water 15 to the bottom of the pan. To facilitate the removal of the dead insects and their ultimate disposal, there is provided a screen wire basket 37, which, in FIG. 1, is shown in inoperative position for clarity of illustration. The basket 37 is formed conformably with the pan 13 with a pair of spaced parallel circular wires 39,41 forming the bottom and top supports, respectively and a plurality of interconnecting wires as at 43,44 and 45 to provide a skeleton over which a fine mesh wire screen can be mounted. The screening covering only the side and bottom walls of the basket 37.

When the trap is not in use, the basket 37, is hooked to and suspended by a pair of hooks 47, 49, out of and vertically above the pan 13 and its contents.

When in use, the basket 37 is unhooked and lowered into the pan 13 so that when the dead insects fall through the water 15 they land on the wire screen of the basket, either on the bottom wall thereof or on the side walls. Then, after a period of time, the basket can be removed from the pan and the dead insects disposed of in any suitable manner.

It will be noted, that the strut rods 19, 21 and 23 are positioned about 90° apart leaving an opening free of strut rod sufficient to permit easy removal of the basket 37 from the trap.

A feature of my invention resides in the provision of over-flow means for water from the pan 13 in the event rain water or water from other sources tends to fill the pan to overflowing, so that, in the absence of the special means provided, oil or kerosene, would spill over and deface or damage the adjacent property such as the patio floor.

Figure 2:
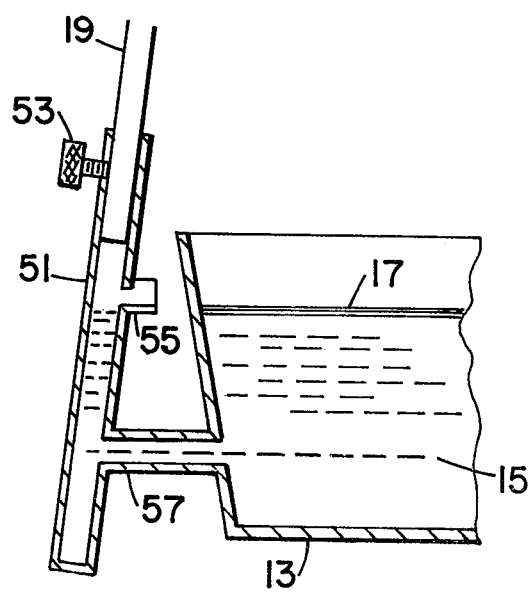
FIG. 2 is a fragmentary cross-sectional view drawn to an enlarged scale of a preferred form of overflow means and FIG. 3 is an axial cross-sectional view of a modified form of the invention.

As shown in FIG. 2, a preferred form of overflow means comprises a tubular sleeve 51 that coaxially receives the strut rod 19, the latter being secured in position by a screw 53 which passes through an opening in the sleeve 51 vertically above the location of a spout 55, which in turn, is formed in sleeve 51 vertically above a by-pass shunt 57 that interconnects the pan 13 and the sleeve 51.

It will thus be understood that so long as the level of the water 15 and the floating layer of oil or kerosene 17 is initially between the level of the spout 55 and the by-pass shunt 57, addition of water to the pan, will merely cause water to flow through the by-pass shunt 57, up the sleeve 51 to the spout 55 and drain therefrom leaving the oil or kerosene layer intact and well below the rim of the pan 13.

If desired, identically constructed overflow means may be provided at the foot of each of the other strut rods 21 and 23 further to ensure overflow of excess water without spilling oil or kerosene.

Figure 3:
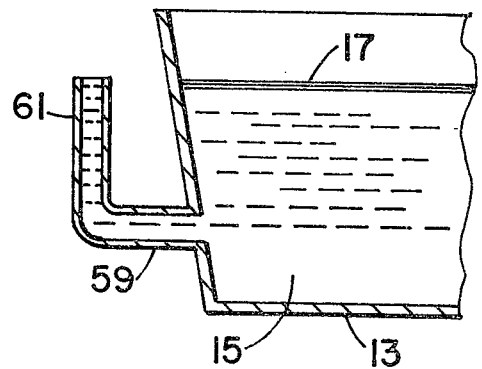

In a modified form of overflow means, as shown in FIG. 3, a section of hollow pipe 59 is fitted into the wall of pan 13 intermediate the rim and bottom thereof. The pipe 59 is bent with an upstanding part 61 which terminates below the level of the rim of pan 13. It will be seen, therefore, that with the level of the water and floating layer of oil or kerosene between the junction of the pipe 59 and pan wall that the rim of the pan 13, excess water resulting from rainfall or other source will cause the water level to rise in the pipe to overflowing while the layer of oil or kerosene still remains below the rim of the pan.

The insect trap of this invention is readily movable from place to place and to facilitate handling, there is provided a handle 63 which may be spot welded to the top of cover 27. Also, to suspend the trap from a cantilever or hook (not shown) an eyelet 65 is welded to the bight portion of the handle 63.

There has thus been described a novel flying insect trap which is economical to construct, parts of which may be fabricated of plastic, using mass production techniques. The risk of spilling oil or kerosene onto patio floors, flower beds or other decorative parts of gardens is minimized by the provision of overflow means whereby excess water resulting from sudden rainfall or other sources is permitted to overflow while the oil or kerosene floated thereon is prevented from overflowing.

And for the purpose of the present disclosure, I have referred to oil or kerosene as useable petroleum liquids as the media for exterminating the lured flying insects. It will be understood that within the scope of the appended claims, other liquids can be employed with equal effectiveness.

As many modifications and variations of the present inventions are possible in the light of the above teachings, it will be understood that within the scope of the appended claims, the invention can be practiced without departing from the spirit of the claims.

What is claimed is:

1. An insect trap comprising a source of UV light, a pan disposed vertically below said source, a plurality of rods supporting said light above said pan, a quantity of water in said pan, a film of petroleum liquid floated on the surface of said water, the water and the petroleum liquid thereon being subject to overflow in response to unwanted overfilling of said pan with water, and overflow means connected to said pan responsive to a rise in water level above a predetermined amount to cause overflow of said water without overflow of said petroleum liquid, said overflow means comprising hollow sleeve means surrounding at least one of said rods and a shunt connection between said pan and said sleeve means.

2. The trap as defined in claim 1 wherein hollow sleeves are coupled to each of said rods, and means providing a shunt connection between said pan and said sleeves.

3. The trap as defined in claim 2 further comprising spout means in said sleeves through which overflow water can pass.

4. The trap as defined in claim 1, further comprising an outlet spout above said shunt and below the rim of the pan wherein the water is preliminarily maintained at a level between said shunt and said outlet spout.

5. The trap as defined in claim 1 wherein flying insects are attracted by said source of UV light and eventually plunge into the pan being exterminated during passage through the petroleum liquid and the water, the trap further comprising means for removing the dead insects without disturbing the petroleum liquid or the water.

6. The trap as defined in claim 5 wherein said insect removing means comprises a screen wire basket formed to be received in said pan in nesting relation therewith and providing a landing surface for dead insects when said insects fall through the petroleum liquid and water, said basket being removable to dispose of the dead insects.

* * * * *